(12) United States Patent
Daley

(10) Patent No.: US 7,493,634 B1
(45) Date of Patent: Feb. 17, 2009

(54) MUSIC MEMORABILIA

(76) Inventor: Michael Daley, 3682 Seascape Dr., Huntington Beach, CA (US) 92649

( * ) Notice: Subject to any disclaimer, the term of this patent is extended or adjusted under 35 U.S.C. 154(b) by 539 days.

(21) Appl. No.: 11/367,854

(22) Filed: Mar. 3, 2006

(51) Int. Cl.
G11B 17/04 (2006.01)
(52) U.S. Cl. ..................................... 720/718
(58) Field of Classification Search ................ 720/718, 720/719, 658, 672, 738; 369/273, 44.26, 369/286, 275.4, 283, 288
See application file for complete search history.

(56) References Cited

U.S. PATENT DOCUMENTS

| 5,579,905 | A | 12/1996 | Ingber |
| 6,082,774 | A | 7/2000 | Schlauch |
| 6,176,614 | B1 | 1/2001 | Taylor |
| 6,827,209 | B1 | 12/2004 | Tank |
| 2001/0010330 | A1 | 10/2001 | Defabio, Jr. |
| 2002/0021001 | A1* | 2/2002 | Stratford et al. ............... 283/74 |
| 2003/0191694 | A1 | 10/2003 | Vonfeldt |
| 2005/0016042 | A1 | 1/2005 | Barratta |
| 2005/0035196 | A1 | 2/2005 | Whitmarsh |
| 2005/0116465 | A1 | 6/2005 | Muscat |

* cited by examiner

Primary Examiner—Allen T Cao

(57) ABSTRACT

The present invention relates to articles and methods for producing and distributing a memorabilia object. A music recording object may be prepared that may have at least one printed indicia selected from the group consisting of a photograph, an autograph and a label color. The music recording object may be packaged in a container having at least one memorabilia object from a recording artist of the music recording object. A limited edition identification number may be placed on the music recording object. The container may be enclosed in a sealed package having the appearance of a standard music recording object. Multiple music recording objects and standard music recording objects may be simultaneously distributed for sale.

19 Claims, 1 Drawing Sheet

MUSIC MEMORABILIA

BACKGROUND OF THE INVENTION

This invention relates to objects or articles and methods for use of memorabilia for promoting sales of music CD or DVD recordings and to enhance collector activity for such memorabilia. The new objects and methods may enhance the value of selected CD or DVD objects for persons who wish to collect such objects and may aid in the sale of all music CD or DVD recordings whether or not each CD or DVD recording has been specially enhanced.

Collectable items or objects, such as, trading cards having pictures of popular persons and information about them may be in use. These objects may be valued and traded by persons wishing to collect trading cards. Memorabilia from certain events or activities may also be used for collectors activities, for example, a baseball bat used in a baseball game may be sold as a collector's item. The bat may also be cut into pieces to create multiple objects for collectors purposes. Other examples of collectables may include special edition publication of books with quality paper, bindings and other enhancements. These books may be sold in limited addition and may have an authors original signature in each set of books.

SUMMARY OF THE INVENTION

The present invention is directed towards articles and methods for producing and distributing a memorabilia object. A music recording object may be prepared that may have at least one printed indicia selected from the group consisting of a photograph, an autograph and a label color. The music recording object may be packaged in a container having at least one memorabilia object from a recording artist of the music recording object. A limited edition identification number may be placed on the music recording object. The container may be enclosed in a sealed package having the appearance of a standard music recording object. Multiple music recording objects and standard music recording objects may be simultaneously distributed for sale.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
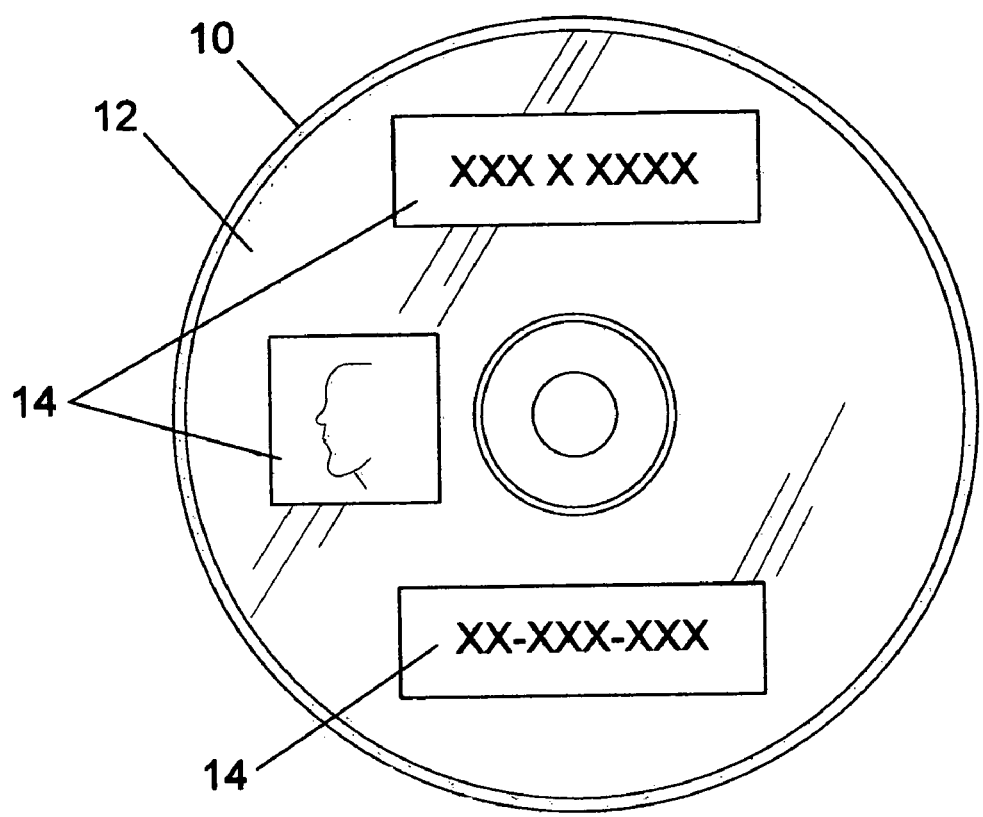
FIG. 1 illustrates a CD music recording object according to an embodiment of the invention.
Figure 2:
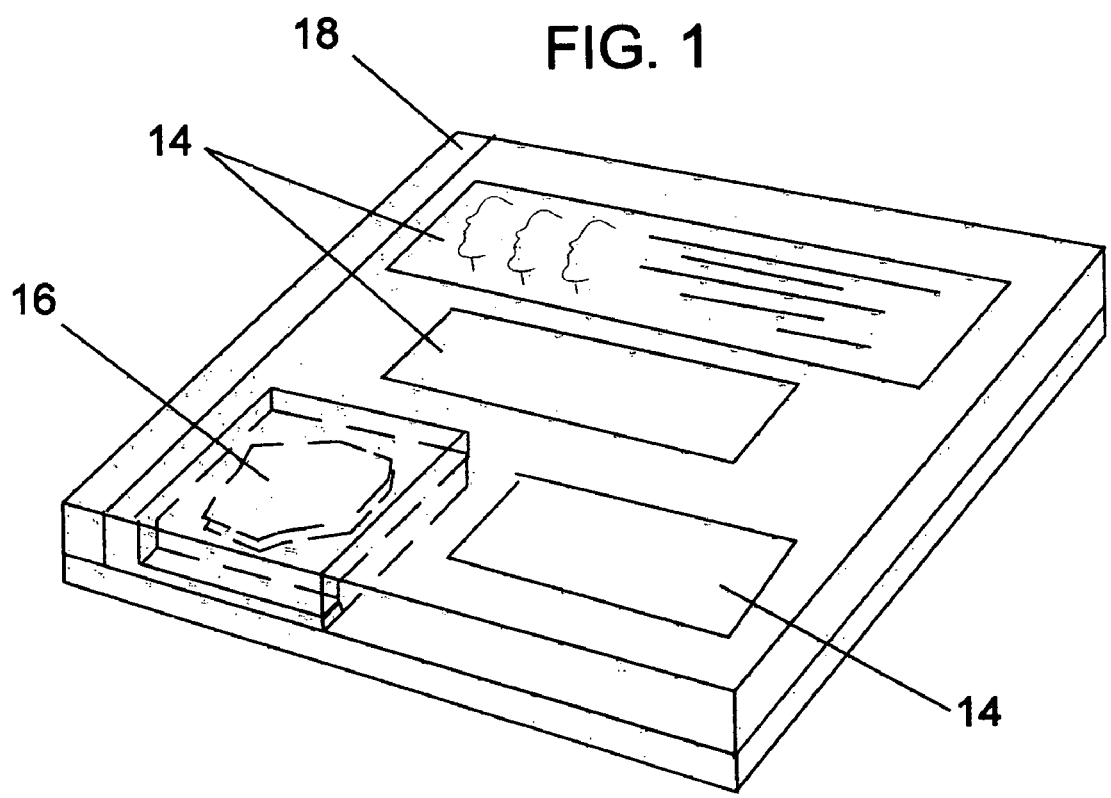
FIG. 2 illustrates a special cover according to an embodiment of the invention.

Referring to FIGS. 1 and 2, a CD or DVD music recording object 10 or article may have imprinted on the nonrecorded side 12 various indicia 14 of the recording artist or band. Examples of indicia 14 may be photographs, original autographs, limited edition numbering, coloring, such as, gold, silver and platinum label for recordings that achieve such status, first recoding designations for new singers and the like indicia. The music recording object 10 may also be colored, such as, gold, silver or platinum. The CD or DVD objects may also be sold in special covers 18 that may have similar indicia and may also have memorabilia 16 from an artist, for example, a portion or fragment of a piece of clothing or costume used by the artist. The music recording objects 10 may also be sold with copies of sheet music and lyrics that may be autographed as memorabilia objects 16. Interview records or audio dialog of artist or band members that may provide the history or background information on the motivation or why, the how and where, and the roles each artist may have played in producing a recording may be included with the music recording object 10.

While some indicia, such as autographs and photographs, may be used at concerts or live events to promote an artist and the music, this may be of limited value for promoting sales of recordings in stores and other marketing outlets. In the example of a live performance, if in addition to those attending the performance, a limited edition number of music recording objects 10 may be produced with indicia 14 and special covers 18 that may have memorabilia 16 from the live performance mounted therein for distribution to attendees and for sale to the general public.

The limited edition recording objects 10 and special covers 18 may be packaged in a container, such as may be currently understood in the art as a plastic container or a container and sealed package approved by the industry entities ASCAP or BMI. The plastic container may have covering material that may be identical for standard CD or DVD recordings to be sold and for limited edition objects 10 to be sold. This may encourage purchasers to purchase a CD or DVD recording hoping to purchase one of the limited edition recording objects 10. The container may be enclosed in shrink wrap material to prevent searching for a limited edition recording object 10 prior to purchase.

The example of creating an enhanced limited edition recording object 10 may also be used for other events, for example, if a music recording achieves gold, silver or platinum status in sales. A limited edition recording object 10 may be produced with indicia in a selected number of a total quantity and then be packaged and sold with the standard CD or DVD being sold.

Another example may be used for music recordings made by multiple music artists or band members. Each band member or artist may sign a limited edition recording object 10 singly or individually such that collectors may make multiple purchases of CD or DVD recordings to attempt to collect all artists signatures. The multiple artists may be individual well known musicians gathered for a specific concert or media event. With multiple artists or band members, all participants may also sign the same music recording objects 10 together to create a limited number of limited edition recording objects 10.

A limited edition recording object 10 may be produced with an extra song that may be specially recorded thereon. Other sound track recordings may also be recorded on a music recording object 10, for example, an audio dialog relative or related to the music recoding object 10 or an unrelated recoding of a new artist, commentary or the like.

The limited edition recording object 10 may be produced and packaged to include security and integrity of limited edition recording object 10 authentication. The security elements may include an actual autograph, a special stamp or hologram, a microchip embedded in the CD, DVD or special cover, a DNA print and the like. The shrink wrap packaging may include internal air exposure indicators to identify packaging with a broken seal.

The use of CD or DVD music recording objects 10 and special covers 18 with various indicia or special recordings may enhance sales of standard CD or DVD recordings and may counter piracy of music content as users may seek the enhancements associated with physical CD or DVD limited edition recording objects that can not be acquired electronically. CD or DVD objects 10 may also be sold at a higher price than the standard recording CD or DVD. Purchasers may want to save a collectable version and also purchase a standard version for listening.

While the invention may have been disclosed in a music CD or DVD context, other music recording media may be similarly enhanced and marketed. While the terms CD and DVD have been used in the description, other recoding media, for example, improved or enhanced media technology such as high definition, BLUERAY and current or future recoding and playback devices and techniques for recorded media may be similarly enhanced and marketed. In addition other recorded subject matter, for example, movies, may also have recorded media enhanced and marketed.

While the invention has been particularly shown and described with respect to the illustrated embodiments thereof, it will be understood by those skilled in the art that the foregoing and other changes in form and details may be made therein without departing from the spirit and scope of the invention.

I claim:

1. An article of memorabilia for promoting sales of music recordings comprising:
   a music recording object;
   an indicia printed on a nonrecorded side of said music recording object;
   a limited edition identification number printed on said nonrecorded side;
   said music recording object disposed in a container that is enclosed in a sealed package; and
   said limited edition identification and said indicia shielded from viewing external to said sealed package.

2. The article as in claim 1 wherein said indicia is selected from the group consisting of a photograph, an autograph and a label color.

3. The article as in claim 1 wherein said music recording object is colored with a color selected from the group of colors consisting of a gold, a silver and a platinum.

4. The method as in claim 3 wherein said packaging step includes a security device selected from the group consisting of an actual autograph, a stamp, a hologram, a DNA print, a microchip embedded in said music recording object and a microchip embedded in said plastic container.

5. The article as in claim 1 wherein said container is a plastic container.

6. A method for producing and distributing a memorabilia article comprising:
   preparing a music recording object having at least one printed indicia selected from the group consisting of a photograph, an autograph and a label color;
   packaging said music recording object in a container having at least one memorabilia object from a recording artist of said music recording object;
   enclosing said container in a sealed package having the appearance of a standard music recording object; and
   distributing for sale a plurality of said music recording objects and said standard music recording objects.

7. The method as in claim 6 wherein said indicia and said memorabilia object are selected from a live concert performance.

8. The method as in claim 6 wherein said memorabilia object is the sheet music for said music recording object.

9. The method as in claim 6 wherein said label color is chosen from the group consisting of gold, silver and platinum as reflected by a current sales status of said standard music recording object.

10. The method as in claim 6 wherein said music record object is a recording of a plurality of music artists and each artist autographs a different plurality of music recording objects.

11. The method as in claim 6 wherein at least one additional music track relative to said standard music recording object is recorded on said music recording object.

12. The method as in claim 6 wherein at least one additional sound track of an audio dialog relative to said music recording object is recorded on said music recording object.

13. The method as in claim 6 wherein after the step of preparing a music recording object, placing a limited edition identification number on said music recoding object.

14. The method as in claim 6 wherein after the step of preparing a music recording object, coloring said music recording object with a color selected from the group of colors consisting of a gold, a silver and a platinum.

15. The method as in claim 6 wherein said sealed package having a broken seal indicator.

16. The method as in claim 6 wherein said distributing for sale includes pricing said music recording object and said standard music recording object at the same price.

17. An article of memorabilia for promoting sales of motion picture and television recordings comprising:
   a recording object;
   an indicia printed on a nonrecorded side of said recording object;
   a limited edition identification number printed on said nonrecorded side;
   said recording object disposed in a container that is enclosed in a sealed package; and
   said limited edition identification and said indicia shielded from viewing external to said sealed package.

18. The article as in claim 17 wherein said indicia is selected from the group consisting of a photograph, an autograph and a label color.

19. A method for producing and distributing a memorabilia article comprising:
   preparing a recording object having at least one printed indicia selected from the group consisting of a photograph, an autograph and a label color;
   packaging said recording object in a container having at least one memorabilia object from a recording artist of said recording object;
   placing a limited edition identification number on said recording object;
   enclosing said container in a sealed package having the appearance of a standard recording object; and
   distributing for sale a plurality of said music recording objects and said standard recording objects.

* * * * *